United States Patent [19]
Kim et al.

[11] Patent Number: 5,652,699
[45] Date of Patent: Jul. 29, 1997

[54] HIGH-VOLTAGE AND HIGH-POWER STABILIZED DC POWER SUPPLY USING MODIFIED SINE WAVE OUTPUT 3-PHASE INVERTER

[75] Inventors: Jung-Moog Kim; Seung-Kyu Pak; Euo-Chang Jung; Cheol-Jung Kim; Jong-Min Lee, all of Daejeon-Si, Rep. of Korea

[73] Assignees: Korea Atomic Energy Research Institute, Daejeon-si; Korea Electric Power Corporation, Seoul, both of Rep. of Korea

[21] Appl. No.: 514,505

[22] Filed: Aug. 11, 1995

[30] Foreign Application Priority Data

May 9, 1995 [KR] Rep. of Korea ............ 95-11252

[51] Int. Cl.$^6$ .................................................. H02M 5/45
[52] U.S. Cl. ..................................................... 363/8
[58] Field of Search ...................... 363/8, 9, 21, 23, 363/25, 37

[56] References Cited

U.S. PATENT DOCUMENTS

| | | | |
|---|---|---|---|
| 4,171,488 | 10/1979 | Kuchnel | 250/421 |
| 4,447,695 | 5/1984 | Inoue | 363/37 |
| 4,601,051 | 7/1986 | Santurtun et al. | 378/118 |
| 5,367,448 | 11/1994 | Carroll | 363/89 |

*Primary Examiner*—Matthew V. Nguyen
*Attorney, Agent, or Firm*—Armstrong, Westerman, Hattori, McLeland & Naughton

[57] ABSTRACT

A stable DC power system of high-voltage and good-output performance is provided by adding a 3-phase inverter, whereby modified waveform for an output control is produced and a filter to a conventional DC power system and by bridge-rectifying. The modified sinusoidal wave such as a varied wave whose upper portion ranging from 30° to 150° is flat of a ½ cycle of the sinusoidal wave, a modified wave whose portions ranging from 30° to 90° and from 90° to 150° are linear in a ½ cycle of the sinusoidal wave and a modified wave whose portions ranging from 30° to 90° and from 210° to 270° are recessed so as to be symmetrical with respect to a line in the whole cycle of the sinusoidal wave are used for reducing ripples of the output voltage after the 3-phase rectification.

5 Claims, 4 Drawing Sheets

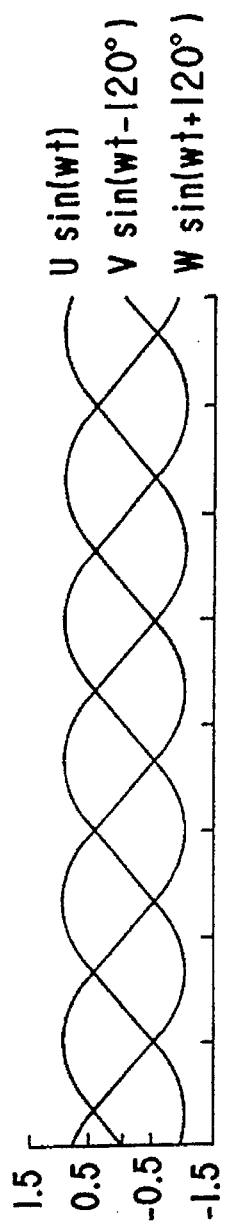
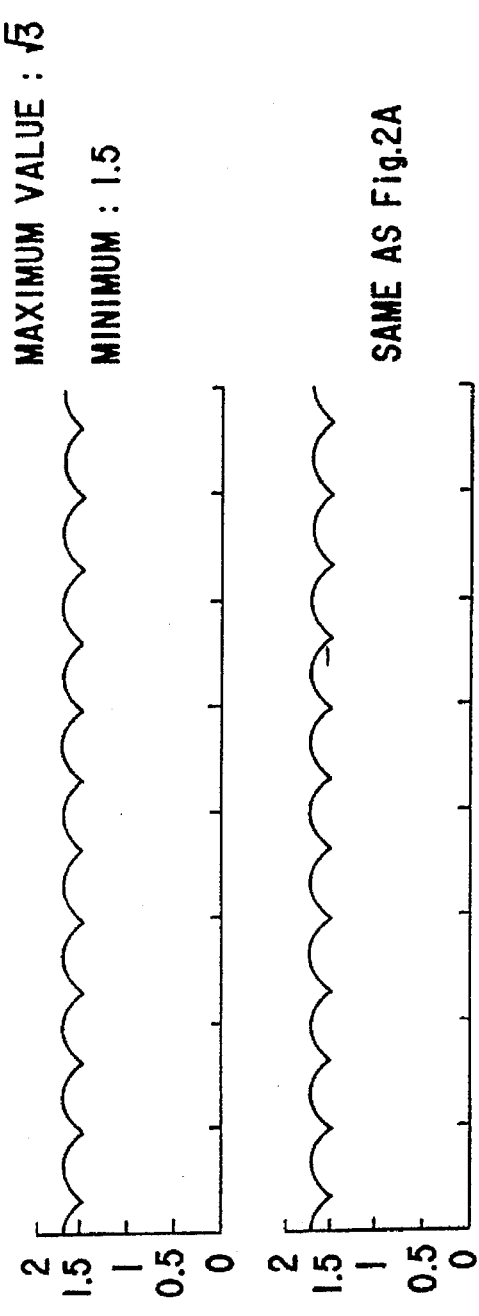
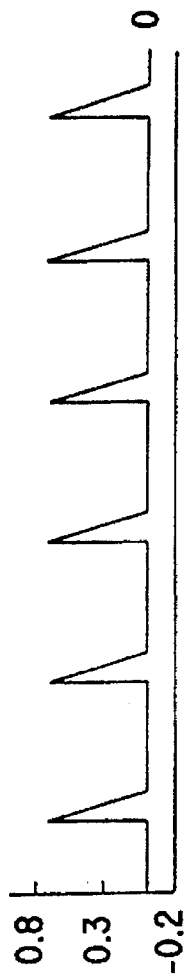
FIG.2A 3-PHASE INPUT
FIG.2B PRIOR ART
FIG.2C PRIOR ART
FIG.2D PRIOR ART

HIGH-VOLTAGE AND HIGH-POWER STABILIZED DC POWER SUPPLY USING MODIFIED SINE WAVE OUTPUT 3-PHASE INVERTER

BACKGROUND OF THE INVENTION

The present invention relates to a direct-current (DC) power supply system which generates stable DC power of high-voltage and high-output performance after three-phase bridge-rectifying, and more particularly, to a DC power system adopting a three-phase inverter by which a modified waveform for an output control is produced. There are many types of DC power supply such as slidac-adopted, thyristor phase controlled, linear and switch mode power supply etc. As a conventional high-voltage and high-power DC power supply system, there are a slidac-adopted output control type and a thyristor phase controlled output control type, respectively as shown in FIGS. 1A and 1B.

However, according to such conventional methods, though the slidac-adopted output control type shown in FIG. 1A has the same characteristics throughout the range of all outputs, it is not easy to control automatically the slidac for the output control, and it is difficult to make the slidac for high power system. Also, since the thyristor phase controlled output control type shown in FIG. 1B controls the output by a phase control of the thyristor, an automatic control is easy to be attained and the power converting efficiency is also high. However, homogeneous characteristics cannot be obtained throughout the range of all outputs. Particularly, during low-voltage output voltage ripples increase such as sawtooth wave.

To be described in more detail, the characteristics of the output voltage waveform of the conventional apparatus shown in FIGS. 1A and 1B are shown in FIGS. 2A to 2D, in which FIG. 2B shows the output voltage waveform for a slidac-adopted output control type, FIG. 2C shows the whole output voltage waveform for a thyristor phase-controlled output control type, and FIG. 2D shows the low output voltage waveform for the thyristor phase-controlled output control type.

In the conventional 3-phase power rectifying power supply circuit, if the input waveform is a normalized sinusoidal wave sin (wt) with respect to the 3-phase bridge rectification, the maximum value of the output voltage is √3 ($\approx$1.732), and the minimum value thereof is 1.5 for both cases of using slidac and thyristor, as shown in FIG. 2A to 2D. Thus, the ripple voltage of the maximum output is 0.232 for a circuit having no smoothing filter such as inductor or capacitor. Therefore, the conventional apparatus involves a problem of the voltage ripple.

SUMMARY OF THE INVENTION

To solve the above-described problem of the conventional apparatus, it is an object of the present invention to provide a direct-current (DC) power supply system which can facilitate a high-output performance, can allow a precise control and can obtain a stable DC power outputs form which no ripple is contained theoretically.

To accomplish the above object, the DC power supply system according to the present invention comprises: a 3-phase inverter modulates a 3-phase power input into a special form of a pulse train and outputs the modulated pulse train. A filter for filtering the output pulse train of the 3-phase inverter makes the filtered wave into a form fo a sinusoidal wave, a 3-phase transformer increases or decreases the voltage of the sinusoidal wave into a desired voltage level, and a 3-phase bridge rectifier rectifies the output of the 3-phase transformer and outputs direct current having no ripples, whereby stable direct current power of a high-voltage, high-power and good output performance is obtained.

BRIEF DESCRIPTION OF THE DRAWINGS

FIGS. 1A and 1B are circuit diagrams of a conventional 3-phase power rectifying type variable high-voltage and high-power output DC power supply system, in which FIG. 1A is a slidac-adopted output control type, and FIG. 1B is an thyristor phase-controlled output control type;

FIGS. 2A to 2D are output voltage waveform diagrams of the conventional 3-phase power rectifying power supply, in which FIG. 2B shows the output voltage waveform for the slidac-adopted output control type, FIG. 2C shows the whole output voltage for the thyristor phase-controlled output control type, and FIG. 2D shows the low output voltage for the thyristor phase-controlled output control type;

FIG. 4A to 4C show various types of modified sinusoidal waves and frequency spectrums, which are generated by the system shown in FIG. 3, in which FIG. 4A shows one modified waveform whose upper part ranging from 30° to 150° is flat of a ½ cycle of the sinusoidal wave and the frequency spectrum thereof; FIG. 4B shows another modified waveform whose parts ranging from 30° to 90° and from 90° to 150° are linear in a ½ cycle of the sinusoidal wave and the frequency spectrum thereof; FIG. 4C shows the other modified waveform whose parts ranging from 30° to 90° and from 210° to 270° are pitted so as to be symmetrical with respect to a line in the whole cycle of the sinusoidal wave and the frequency spectrum thereof.

DETAILED DESCRIPTION OF THE INVENTION

This invention, DC power supply system, is using 3-phase inverter with modified wave outputting as an output control to get stabilized high-voltage, high-power after the bridge-rectifying of the 3-phase power.

There are linear mode and switch mode DC power supply units with fine variable output voltages as conventional systems. It is not easy for these conventional systems to get high-power over several KV of output voltages or over several KW of output power, specially, it's very difficult actually to get output power over several tens KW.

This suggested system can get high-power and stabilized DC power outputs with fine control camparatively by using a 3-phase inverter which generates modified sinusoidal waves as an output control. Also this system generates high-power outputs having no ripples theoretically after 3-phase bridge rectifying.

A 3-phase inverter which is generally used for controlling 3-phase electric motors is typically the VVVF (variable-voltage and variable-frequency) type and adopts the PWM (pulse width modulation) method to make output waveforms into sinusoidal wave.

Figure 1A:
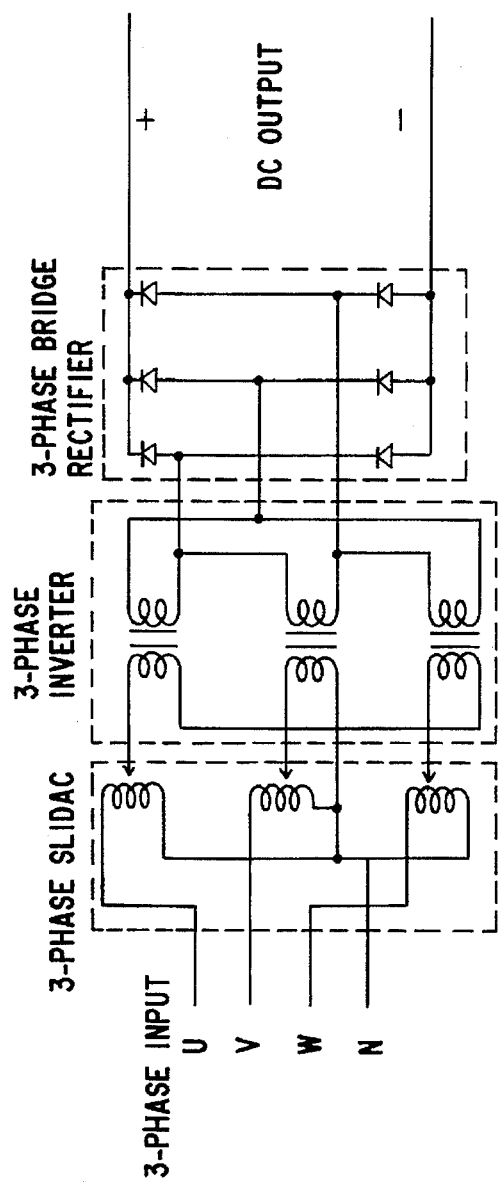
Figure 1B:
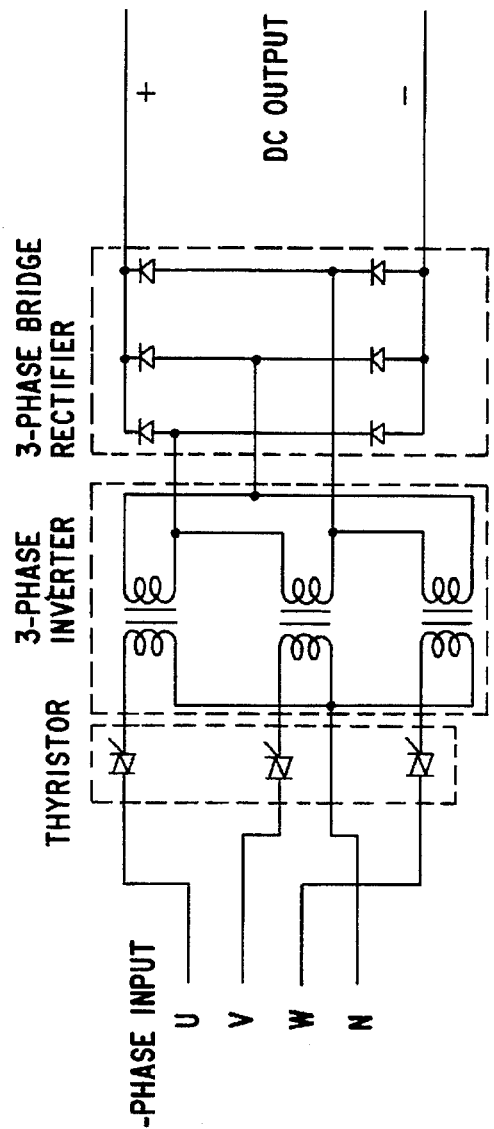

The circuit diagrams of the conventional 3-phase power rectifying type, DC power supply system of variable high-voltage and high-power performance, are shown in FIG. 1. Though the slidac-adopted output control type in FIG. 1A has the same characteristic throughout the range of all outputs, it is not easy to control automatically the slidac for output controls and to make the slidac for high-power performance system. Also, since the thyristor adopted phase-controlled output control type shown in FIG. 1B. controls the output by a phase control of the thyristor, the automatic control is easy to get high-power output and the power converting efficiency is also good. However, homogeneous characteristics can not be obtained throughout the range of all outputs. Particularly, the ripple voltage in the low output voltage ranges is increasingly generated. The ripple voltages of conventional systems shown in FIG. 1 are shown in FIG. 2A.

In conventional 3-phase rectifying power supply systems shown in FIG. 2A, if input signal is the sinusoidal wave sin (wt) in the 3-phase bridge-rectification, the maximum ripple value of the output voltage is √3 (≈1.732) and the minimum output ripple volatge value is 1.5 for both cases of using slidac and thyristor adopted system as shown in FIG. 2B and FIG. 2C. Thus the ripple voltage of the maximum output is 0.232 for a circuit without smoothing storage battery. This invention is based on the idea that output waveforms of a 3-phase inverter which adopts PWM (pulse width modulation) method for a 3-phase motor control can be made into a modified sinusoidal waves having no ripples after 3-phase bridge rectifying. It means that output ripples can be reduced extremely in this system without smoothing storage battery in FIG. 2A.

Figure 4A:
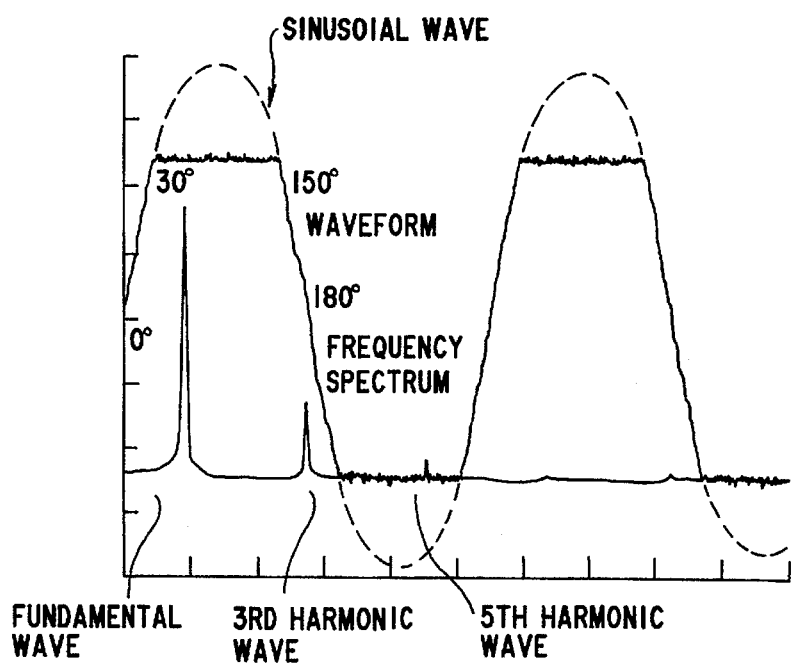
Figure 4B:
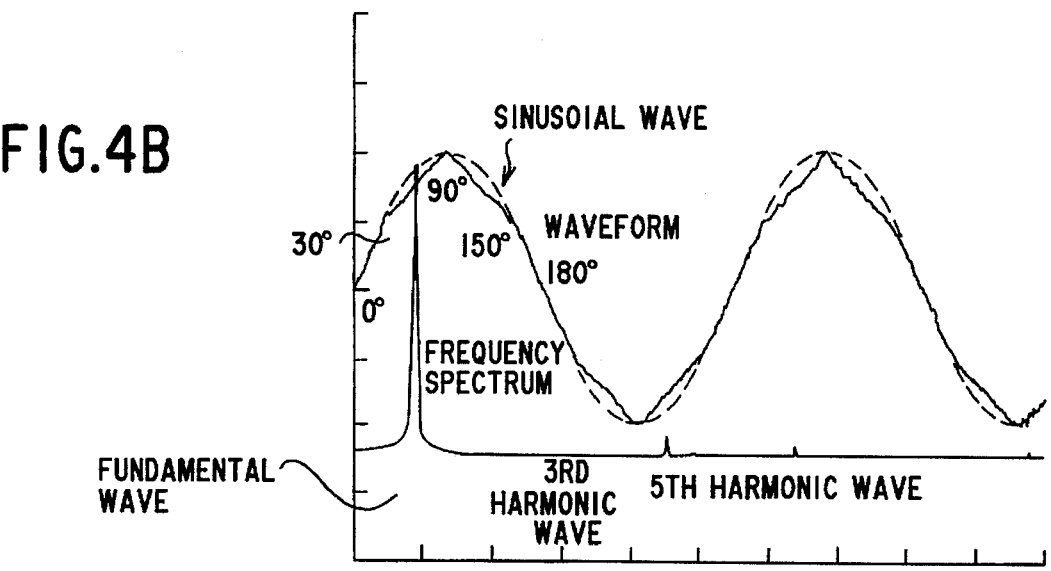
Figure 4C:
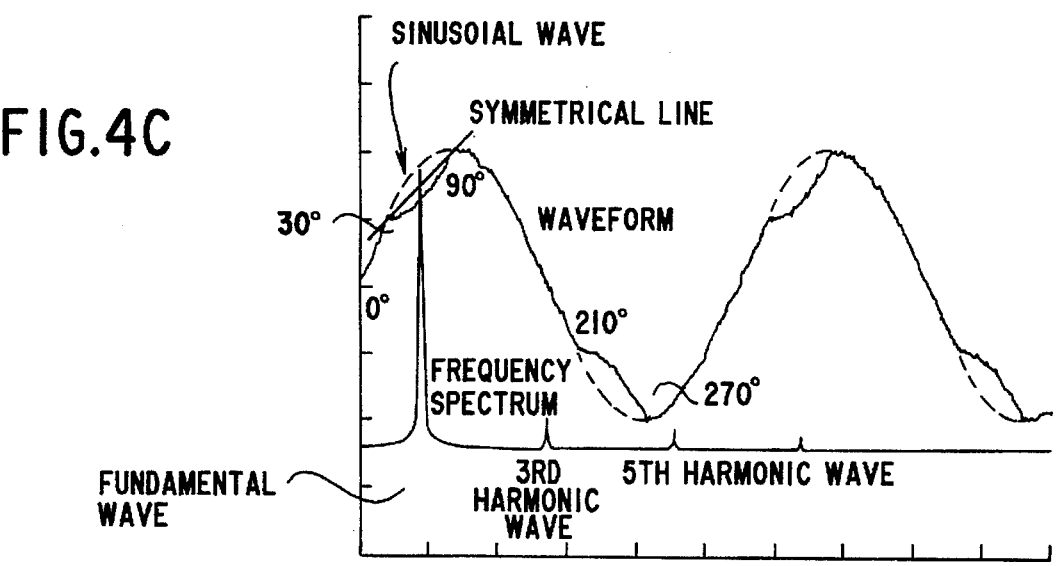

Modified sinusoidal waves and frequency spectrums to reduce output ripple voltages after 3-phase bridge rectifying are shown in FIG. 4. FIG. 4A shows a modified wave whose upper portion ranging from 30° to 150° is flat in a ½ cycle of the sinusoidal wave and its frequency spectrum. FIG. 4B shows a modified wave whose portions ranging from 30° to 90° and 90° to 150° are linear in a ½ cycle of the sinusoidal wave and its frequency spectrum. FIG. 4C shows a modified wave whose portions ranging from 30° to 90° and 210° to 270° are recessed so as to be symmetrical with respect to a line in the whole cycle of the sinusoidal wave and its frequency spectrum.

In regarding of the lowest ripple voltage of the output and its spectrum in three modified waves shown in FIG. 4, FIG. 4B is the best waveform practically in designing the transformer and the output filter of a inverter.

The three waves of FIG. 4 after 3-phase rectification are DC (direct current) and the rectified DC value of FIG. 4A is 1 and the rectified DC value of FIG. 4B to 4C is 1.5.

Figure 3:
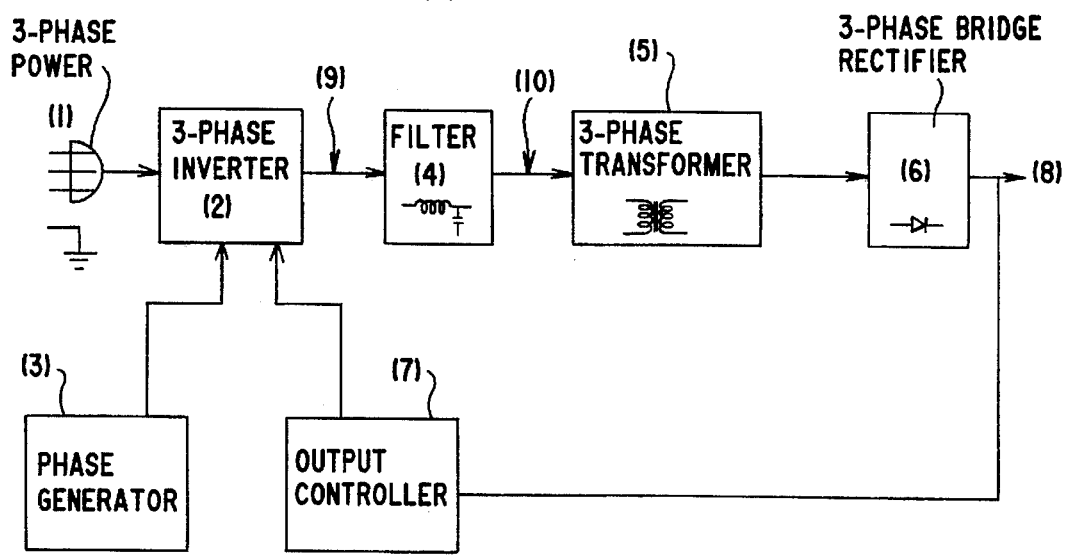
FIG. 3 is a schematic diagram of a stable DC power supply system of a high-voltage, high-power and good output performance according to the present invention.

FIG. 3 is a schematic diagram of this invention, a stabilized DC power supply system having high-voltage and high-output performance by using a 3-phase inverter. The input of a 3-phase inverter (2) is 3-phase power(1) and the output of 3-phase inverter (2) is pulse train (9), the width of this pulse train (9) is modulated by an incorporated pulse generater (3). The pulse train (9) is transformed into modified sinusoidal wave (10) like those waves of FIG. 3 by passing through a filter (4). A 3-phase transformer (5) for increasing or decreasing input voltages converts the modified sinusoidal wave (10) into a desired voltage level and this desired voltage signal is transformed into a DC signal (8) having no ripples by a 3-phase bridge rectifier (6) Whereby stable DC (dircet current) power of a high-voltage high-output performance is obtained. An output controller (7) detects the current and the output voltage of the 3-phase bridge rectifier (6) and controls a 3-phase inverter (2) to make overall stabilized DC power supply system.

What is claimed is:

1. A DC power system, comprising:
    a 3-phase inverter for modulating a 3-phase power input into a form of a pulse train and outputting the modulated input;
    a filter, operably connected to said 3-phase inverter, for receiving said modulated input and for filtering said modulated input of said 3-phase inverter to make the filtered signal into a form of a sinusoidal wave;
    a 3-phase transformer, operably connected to said filter, for receiving said sinusoidal wave and for increasing or decreasing the voltage of said sinusoidal wave into a desired voltage level; and
    a 3-phase bridge rectifier, operably coupled to said 3-phase transformer, for receiving and rectifying the output voltage of said 3-phase transformer and outputting direct current having no ripples theoretically to thereby attain stable current of high-voltage, high-power and good output performance.

2. A DC power system as claimed in claim 1 further comprising an output controller for controlling said 3-phase inverter in response to the DC signal output from three-phase bridge rectifier.

3. A DC power system as claimed in claim 1 wherein said modulated sinusoidal wave is a modified wave whose upper portion ranging from 30° to 150° is flat in a half cycle of the sinusoidal wave.

4. A DC power system as claimed in claim 1 wherein said modulated sinusoidal wave is a modified wave whose portions ranging from 30° to 90° and from 90° to 150° are linear in the whole cycle of the sinusoidal wave.

5. A DC power system as claimed in claim 1 wherein said modulated sinusoidal wave is a modified wave whose portions ranging from 30° to 90° and from 210° to 270° are recessed so as to be symmetrical with respect to a line in a ½ cycle of the sinusoidal wave.

* * * * *